United States Patent [19]

Nagashima

[11] Patent Number: 4,596,301
[45] Date of Patent: Jun. 24, 1986

[54] TRICYCLE
[75] Inventor: Tomoyuki Nagashima, Asaka, Japan
[73] Assignee: Honda Giken Kogyo Kabushiki Kaisha, Tokyo, Japan
[21] Appl. No.: 559,701
[22] Filed: Dec. 9, 1983
[30] Foreign Application Priority Data
Dec. 25, 1982 [JP] Japan .................. 57-199238[U]
[51] Int. Cl.⁴ .................. B62J 1/04; B62K 5/02
[52] U.S. Cl. .................. 180/215; 180/89.17; 180/225; 280/5 A; 280/281 B; 280/152.1; 297/193; 297/243
[58] Field of Search .......... 180/219, 225, 89.11, 180/89.17, 69.2, 69.21, 69.24, 215, 210, 211, 212; 280/5 A, 5 H, 7.11, 281 B, 289 R, 289 A, 289 S, 152.1; 296/78.1; 297/193, 195, 243

[56] References Cited
U.S. PATENT DOCUMENTS

| | | | |
|---|---|---|---|
| 4,321,978 | 3/1982 | Tominaga et al. | 180/225 |
| 4,372,416 | 2/1983 | Igarashi | 180/215 |
| 4,413,700 | 11/1983 | Shiratsuchi | 180/219 |
| 4,416,348 | 11/1983 | Fukui | 180/210 |
| 4,461,489 | 7/1984 | Tsukiji et al. | 280/5 A |
| 4,496,019 | 1/1985 | Tanaka | 180/215 |

Primary Examiner—David M. Mitchell
Assistant Examiner—M. J. Hill
Attorney, Agent, or Firm—Birch, Stewart, Kolasch & Birch

[57] ABSTRACT

A tricycle having at least one front wheel and a front fork carrying the front wheel, fuel and oil tanks positioned at the rear of the front fork, comprising at least one longitudinal frame elongated in a longitudinal direction of the tricycle and securely connected at its foremost end to the front fork structure, the fuel and oil tanks being supported on a front portion of the frame, and a rear fender structure having a front tank cover portion and at least one rear fender portion which merges rearwardly out of the front tank assembly cover portion and which is pivotally connected to the frame in the neighborhood of the rear end of the frame so that the rear fender structure as a whole is pivotally movable between a lower angular position resting on the frame and having the fuel and oil tank assemblies enclosed within the tank cover portion and an upper angular position raised above the frame and the tanks.

8 Claims, 8 Drawing Figures

4,596,301

TRICYCLE

FIELD OF THE INVENTION

The present invention relates to a tricycle with three road wheels and particularly to a power-driven tricycle.

BACKGROUND OF THE INVENTION

An existing power-driven bicycle or tricycle has fuel and oil tank assemblies mounted on the frame structure and positioned in front of the rear fenders of the tricycle. There being provided no means covering the fuel and oil tank assemblies, the tank assemblies on the frame structure are exposed in front of the rider's seat. Serious design considerations are thus indispensable in determining the setups of the fuel and oil tank assemblies per se and the construction and arrangement of the rear fenders in conjunction with the tank assemblies.

It is, accordingly, an important object of the present invention to provide an improved tricycle having fuel and oil tank assemblies enclosed within a unitary structural member detachably supported on the frame structure of the tricycle, thus providing ease in designing the fuel and tank assemblies and the rear fenders of the tricycle. Since the tank assemblies 38 and 40, an internal combustion engine, etc., are exposed when the structural member is detached from the frame structure, the servicing of various parts can be performed very easily.

It is another important object of the present invention to provide an improved tricycle having fuel and oil tank assemblies enclosed within a hollow front portion of a structural member integral with the rear fenders and detachably supported on the frame structure of the tricycle.

It is still another important object of the present invention to provide an improved tricycle having a unitary rear fender structure adapted to provide an ample space for the accommodation of the fuel and oil tank assemblies so that the measurements of the fuel and oil tank assemblies of the tricycle are not restricted by the shape and size of the rear fender structure and can therefore be determined arbitrarily to meet the desired capacities of the tank assemblies. The rear fender structure per se can also be designed without strict consideration of the desired measurements of the tank assemblies.

It is still another important object of the present invention to provide an improved tricycle having a frame structure which is constituted by a single tubular frame and which can be manufactured economically. Due to the relatively large diameter of the single tubular frame constituting such a frame structure, the frame can be utilized as a "snorkel" type air induction pipe for the internal combustion engine of the tricycle.

It is still another important object of the present invention to provide an improved tricycle having a simple and compact construction with the fuel and oil tank assemblies positioned above the frame structure and the engine and transmission assemblies positioned below the frame structure.

It is, yet, still another important object of the present invention to provide an improved tricycle having an engine air cleaner unit which is simple in construction and which is easy and economical to manufacture.

SUMMARY OF THE INVENTION

In accordance with the present invention, there is provided a tricycle having, a front fork structure carrying the front wheel, fuel and oil tank assemblies positioned at the rear of the front fork structure, comprising a frame structure comprising at least one longitudinal frame elongated in a longitudinal direction of the tricycle and securely connected at its foremost end to the front fork structure, the fuel and oil tank assemblies being supported on and positioned above a front portion of the longitudinal frame, and a rear fender structure having a front tank cover portion and at least one rear fender portion which merges rearwardly out of the front tank cover portion and which is pivotally connected to the longitudinal frame in the neighborhood of the rear end of the longitudinal frame so that the rear fender structure as a whole is pivotally movable between a lower angular position resting on the longitudinal frame and having the fuel and oil tank assemblies enclosed within the tank cover portion and an upper angular position raised above the longitudinal frame and the tank assemblies. Preferably, the rear fender structure as a whole is pivotally movable between the lower angular position and the upper angular position about an axis fixed with respect to the frame structure and directed in a transverse direction of the motorcycle. Furthermore, the longitudinal frame is constituted by a hollow steel pipe.

BRIEF DESCRIPTION OF THE DRAWINGS

The features and advantages of a motorcycle according to the present invention will be more clearly appreciated from the following description taken in conjunction with the accompanying drawings in which like reference numerals designate similar assemblies, units, and elements and in which.

DESCRIPTION OF THE PREFERRED EMBODIMENT

Figure 1:
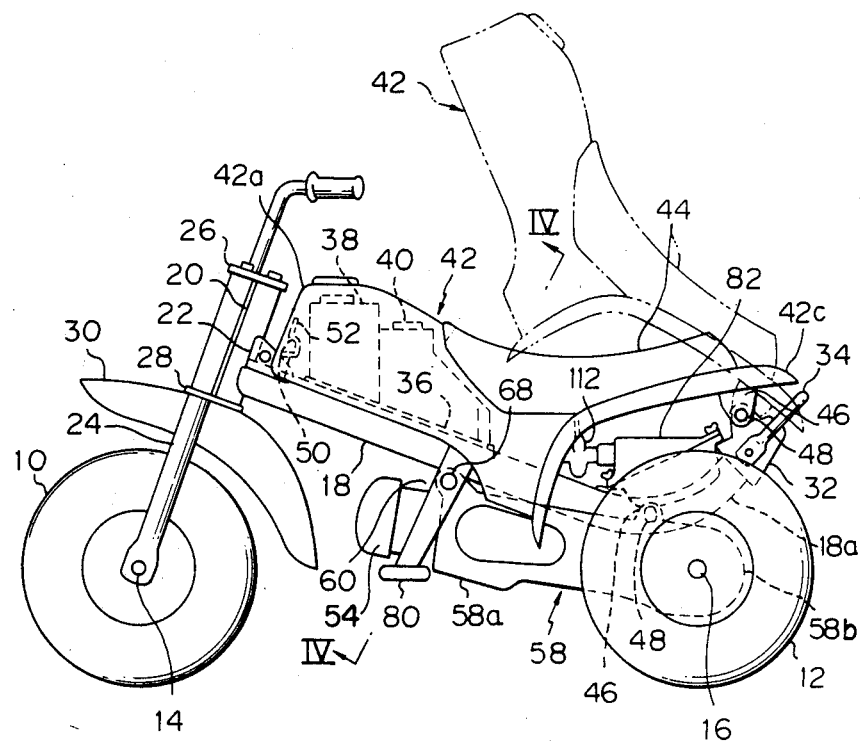
FIG. 1 is a side view of a motorcycle embodying the present invention.
Figure 2:
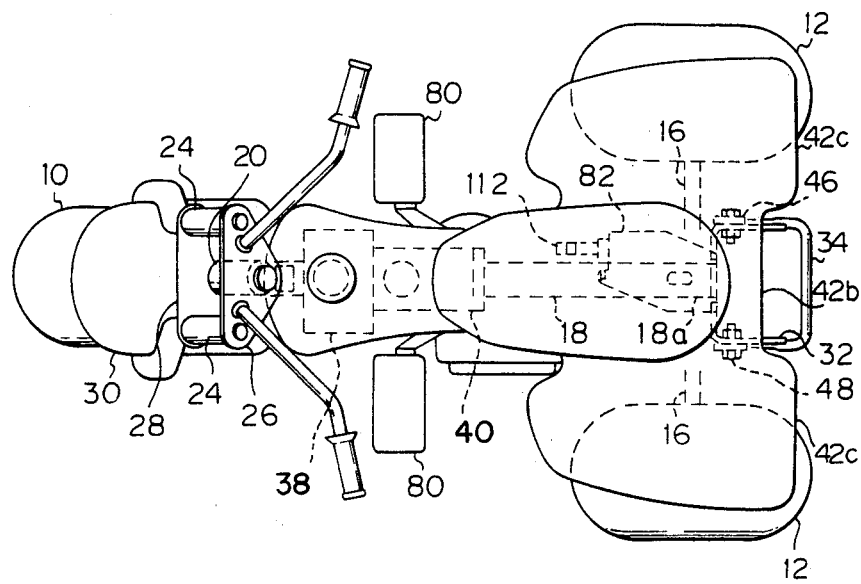
FIG. 2 is a plan view of the motorcycle shown in FIG. 1.

Description will be hereinafter made with reference to the drawings on the assumption that a motorcycle according to the present invention is embodied in a power-driven tricycle. In FIGS. 1 and 2 of the drawings, a motorcycle embodying the present invention is thus shown having a single front wheel 10 and a pair of rear wheels 12 which have respective center axes aligned with each other in a transverse direction of the motorcycle. The front wheel 10 has a spindle 14 carried on its center hub, and the rear wheels 12 have drive spindles 16 carried on their respective center hubs.

The front and rear wheels 10 and 12 are carried by a frame structure comprising a longitudinally elongated, tubular longitudinal frame 18 constituted by a hollow steel pipe which has a rear end portion 18a slanting upwardly above the spindles 16 of the rear wheels 12. The longitudinal frame 18 is welded or otherwise securely connected at its foremost end to a lower portion of a tubular front head post 20 by means of a hollow reinforcement member or gusset 22 secured to the longitudinal frame 18 and the head post 20. The front head post 20 extends upwardly from the foremost end of the longitudinal frame 18 and is securely connected to at its upper and lower ends to a front fork structure 24 by means of bracket members 26 and 28 rotatably mounted, respectively, on the front head post 20. The front fork structure 24 has the front wheel 10 rotatably carried at its lower end by means of the spindle 14 of the wheel 10. A rear wheel fender 30 is attached to, for example, the lower bracket member 28 secured to the front head post 20. The upwardly slanting rear end portion 18a of the frame 18 is welded or otherwise securely connected at its rearmost end to a fender support bracket member 32 having a generally U-shaped cross section. As will be better seen from FIG. 2, the fender support bracket member 32 has a base portion securely attached to the rear end of the longitudinal frame 18, and a pair of side plate portions spaced apart in parallel from each other in a transverse direction of the motorcycle. A lifting handle 34 constituted by, for example, a generally U-shaped steel rod or pipe is bolted, welded or otherwise securely attached to the spaced side plate portions of the bracket member 32 and is directed upwardly and rearwardly from the bracket member 32. The lifting handle 34 is shaped, sized and located to facilitate a rider of the motorcycle to have the rear wheels 12 lifted over the road or land surface. The longitudinal frame 18 has securely mounted on a front portion thereof a support plate 36 having fixedly supported thereon a fuel tank assembly 38 positioned at the rear of the front head post 20 and an oil tank assembly 40 positioned at the rear of the fuel tank assembly 38 as indicated by broken lines in FIGS. 1 and 2.

Figure 3:
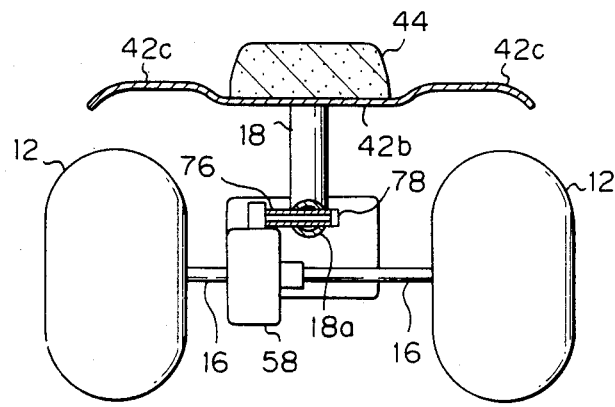
FIG. 3 is a rear end view showing, partly in cross section, the arrangement in which the engine and transmission assemblies of the motorcycle shown in FIGS. 1 and 2 are supported.

The motorcycle embodying the present invention further comprises a unitary rear fender structure 42 largely consisting of a front tank cover portion 42a having a generally U-shaped cross section forming a downwardly open concavity, a rear middle portion 42b merging rearwardly from the front tank cover portion 42a, and a pair of rear fender portions 42c laterally extending outwardly in opposite directions from the rear middle portion 42b as will be better seen from FIG. 3 of the drawings. A seat pad, or assembly 44 is mounted partly on the front tank cover portion 42a and partly on the rear middle portion 42b of the rear fender structure 42. As illustrated in FIG. 1, the upper surface of the front tank cover portion 42a is higher than the upper surface of the seat assembly 44 so that the uppermost ends of the tank assemblies 38 and 40 are higher than the upper surface of the seat assembly 44, thereby the tank assemblies 38 and 40 have sufficiently large volumes, respectively. To the rear fender portions 42c of the rear fender structure 42 are welded or otherwise securely connected a pair of bracket members 46 which project downwardly from the lower faces of the fender portions 42c as will be seen from FIG. 1 and which are spaced apart in parallel from each other in a transverse direction of the motorcycle as will be seen from FIG. 2. The rear fender bracket members 46 of the rear fender structure 42 are pivotally connected to the bracket members 32, respectively, on the longitudinal frame 18 by means of pivot pins 48 having center axes aligned with each other in a transverse direction of the motorcycle. The rear fender structure 42 as a whole is thus tiltable upwardly and downwardly with respect to the longitudinal frame 18 about the aligned center axes of the pivot pins 46 between a lower angular position resting on the longitudinal frame 18 as indicated by full lines in FIG. 2 and an upper angular position raised above the longitudinal frame 18 as indicated by phantom lines in FIG. 2. When the rear fender structure 42 is held in the lower angular position about the aligned center axes of the pivot pins 48, the front tank cover portion 42a of the rear fender structure 36 has the fuel tank assembly 38 and the oil tank assembly 40 on the frame 18 totally enclosed therewithin and the rear fender portions 42c of the rear fender structure 42 partly hang over and are partly spaced apart forwardly from the rear wheels 12, respectively. When the rear fender structure 42 is turned to the upper angular position about the aligned center axes of the pivot pins 48, the front tank cover portion 42a of the rear fender structure 42 is raised above the fuel tank assembly 38 and the oil tank assembly 40 and provides access to each of the tank assemblies 38 and 40 for servicing purposes. The above described lifting handle 34 on the main frame bracket members 32 may be arranged to serve as a stay member to engage the rear fender structure 42 at the rear end of the rear middle portion 42b of the rear fender structure 42 and to support the rear fender structure 42 in weight bearing relationship when the rear fender structure 42 is thus turned to the upper angular position thereof. Suitable locking means may be provided to have the rear fender structure 42 held in the lower angular position covering the fuel and oil tank assemblies 38 and 40 as above described. In FIG. 1 of the drawings, such locking means is indicated by broken lines as comprising a locking element 50 anchored at one end to the previously mentioned reinforcement member or gusset 22 between the longitudinal frame 18 and the front head post 20 and a snap-action hook element 52 secured to a front end wall of the front tank cover portion 42a of the rear fender structure 42.

Figure 4:
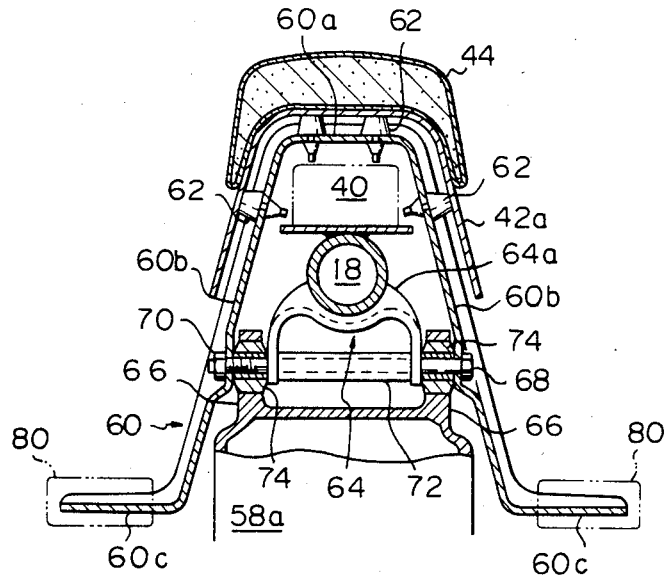
FIG. 4 is a cross sectional view taken along line IV—IV in FIG. 1 and also showing the arrangement in which the engine and transmission assemblies of the motorcycle embodying the present invention are supported.

The motorcycle embodying the present invention further comprises an internal combustion engine 54 and a power transmission (not shown) which are enclosed within a common casing structure 58. As shown in FIG. 1, the casing structure 58 largely consists of an engine body portion 58a positioned below a lengthwise intermediate portion of the longitudinal frame 18 and a transmission casing portion 58b positioned below the rear middle portion 42b of the rear fender structure 42. The power transmission 56 has output shafts (not shown) drivingly connected to the drive spindles 16 of the rear wheels 12, respectively, as will be seen from FIG. 3. The engine and transmission casing structure 58 is suspended from the longitudinal frame 18 and rear fender structure 36 by engine support means connected to the front tank cover portion 42a of the rear fender structure 42 and transmission support means connected to the upwardly curved rear end portion 18a of the longitudinal frame 18. As will be seen from FIGS. 1 and 4, the engine support means comprises a generally inverted U-shaped first or outer engine support bracket member 60 having an upper middle portion 60a located immediately below the front tank cover portion 42a of the rear fender structure 36, and a pair of side leg portions 60b extending downwardly from the upper middle portion 60a and spaced apart from each other transversely of the motorcycle. The outer engine support bracket member 60 is formed with openings located in the upper middle portion 60a and side leg portions 60b thereof and is secured to the front tank cover portion 42a of the rear fender structure 42 by means of mounting elements 62 fixedly fastened to the fender structure 36 and fitted to the bracket member 60 through the openings therein as shown in FIG. 4. Each of the mounting elements 62 is preferably constructed of an elastic material such as rubber. The side leg portions 60b of the bracket member 60 downwardly extend partly inside the side walls of the front tank cover portion 42a of the rear fender structure 36 and partly on both sides of the engine body portion 58a of the engine and transmission casing structure 58. The side leg portions 60b are further formed with holes which are aligned with each other in a transverse direction of the motorcycle and which are located above the engine 54. The engine support means further comprises a generally inverted U-shaped second or inner engine support bracket member 64 having an upper middle portion 64a welded or otherwise securely attached to the longitudinal frame 18 and a pair of side leg portions 64b spaced apart in parallel from each other and inwardly from the side leg portions 60b, respectively, of the outer engine support bracket member 60. The side leg portions 64b of the bracket member 64 are formed with holes which are respectively aligned with the above mentioned holes in the side leg portions 60b of the outer engine support bracket member 60 in a transverse direction of the motorcycle. The engine body portion 58a of the engine and transmission casing structure 58 has a pair of side lugs 66 projecting upwardly from the engine body portion 58a and each located between each side leg portion 60b of the outer engine support bracket member 60 and each side leg portion 64b of the inner engine support bracket member 64. The lugs 66 are formed with holes axially aligned with the holes in the side leg portions 60b of the outer engine support bracket member 60 and the side leg portions 64b of the inner engine support bracket member 64. An elongated joint member constituted by, for example, a mounting bolt 68 is passed through the holes in the side leg portions 60b of the outer engine support bracket member 60, the holes in the side leg portions 64b of the inner engine support bracket member 64 and the holes in the lugs 66 of the engine body portion 58a of the casing structure 58 and is secured at one end to one side leg portion 60b of the bracket member 60 by the head portion of the bolt 68 and at the other end to the other side leg portion 60b of the bracket member 60 by a nut 70 as shown. The engine 54 is thus suspended from the front cover portion 42a of the longitudinal frame 18 by means of the outer and inner engine support bracket members 60 and 64 and the mounting bolt 68. The mounting bolt 68 is axially passed through an elongated sleeve 72 extending between the side leg portions 64b of the inner engine support bracket member 64. The sleeve 72 serves as a spacer to maintain the leg portions 64b of the bracket member 64 spaced apart at a fixed distance from each other inside the side leg portions 60b of the outer engine support bracket member 60. Furthermore, the mounting bolt 68 may be received in the holes in the side leg portions 60b of the outer engine support bracket member 60 through elastic bushes 74 of, for example, rubber closely fitted in the holes. The rubber bushings 74 serve as vibration absorbing means to reduce the vibrations to be transmitted from the engine 54 to the rear fender structure 36. On the other hand, the transmission support means to have the power transmission 56 suspended from the longitudinal frame 18 comprises a tubular bracket member 76 welded or otherwise securely connected to the transmission casing portion 58b of the engine and transmission casing structure 58. The tubular bracket member 76 axially extends in a transverse direction of the motorcycle through holes formed in the upwardly curved rear end portion 18a of the longitudinal frame 18 and is tightened to the frame 18 by means of a suitable fastening element such as a bolt 78 screwed into the tubular bracket member 76. The tubular bracket member 76 is, in this instance, thus assumed to be internally threaded. The outer engine support bracket member 60 forming part of the engine support means as described above may further have a pair of lower end portions 60c horizontally extending away from each other in a transverse of the motorcycle. These lower end portions 60c of the engine support bracket member 60 constitute rider's foot rests and are fitted into rubber blocks 80 as indicated by phantom lines in FIG. 4.

Figure 5:
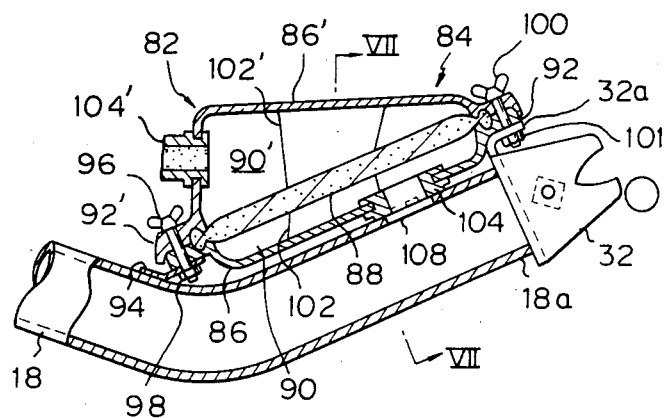
FIG. 5 is a vertical sectional view showing the construction and arrangement of an engine air cleaner unit of the motorcycle embodying the present invention.
Figure 6:
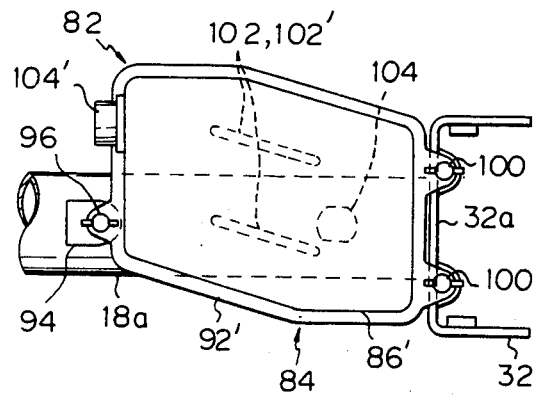
FIG. 6 is a plan view of the air cleaner unit shown in FIG. 5.
Figure 7:
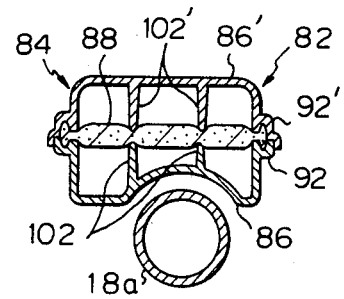
FIG. 7 is a cross sectional view taken on line VII—VII in FIG. 5.

The motorcycle embodying the present invention further comprises an air cleaner unit 82 positioned below the rear middle portion 42b of the rear fender structure 42 and above the upwardly curved rear end portion 18a of the longitudinal frame 18 as will be seen from FIGS. 1 and 2. As illustrated to enlarged scales in FIGS. 5, 6 and 7 of the drawings, the air cleaner unit 82 comprises a hollow casing 84 composed of concave first and second or lower and upper casing halves 86 and 86' having a finely perforated filter web 88 interposed therebetween. The internal space of the air cleaner unit 82 is thus divided by the filter web into two separate chambers consisting of an incoming air chamber 90 defined between one face of the web 88 and the lower casing half 86 and an outgoing air chamber 90' defined between the other face of the web 88 and the upper casing half 86'. The upper and lower casing halves 86 and 86' have flange portions 92 and 92' secured together with an outer marginal portion of the filter web 88 firmly clamped therebetween by suitable fastening means secured to the upwardly curved rear end portion 18a of the longitudinal frame 18. In the arrangement shown in FIGS. 5 to 7, the fastening means is shown comprising a bracket member 94 welded or otherwise securely attached to the rear end portion 18a of the longitudinal frame 18, and a wing or butterfly bolt 96 screwed through holes in the respective flange portions 92 and 92' of the casing halves 86 and 86', a hole in the marginal portion of the filter web 88 and a hole in the bracket member 94 and tightened to the bracket member 92 by means of a nut 98. The fastening means further comprises a pair of wing or butterfly bolts 100 each screwed through holes in the respective flange portions 92 and 92' of the casing halves 86 and 86', holes in the marginal portion of the filter web 88 and holes in extensions 32a of the previously mentioned bracket member 32 on the longitudinal frame 18. The bolts 100 are tightened to the bracket member 32 by means of nuts 101. As will be best seen from FIG. 6, furthermore, the bolt 96 is located at the front end of the air cleaner unit 82 and the bolts 100 are located at the rear end of the air cleaner unit 82. The flange portions 92 and 92' of the upper and lower casing halves 86 and 86' are formed with grooves continuously extending along the flange portions and respectively facing the opposite surfaces of the filter web 88. Thus, the filter web 88 has its outer marginal portion firmly clamped between the respective flange portions 92 and 92' of the casing halves 86 and 86' throughout the entire length of the marginal portion of the filter web 88 so that the lower and upper casing halves 86 and 86' are hermetically sealed against each other along the respective flange portions 92 and 92' thereof. The lower casing half 86 has a pair of spaced, parallel internal projections 102 projecting upwardly from the inner surface thereof, while the upper casing half 86' has a pair of spaced, parallel internal projections 102' projecting downwardly from the inner surface thereof toward the internal projections 102, respectively, of the lower casing half 86. Each of the internal projections 102 of the lower casing half 86 and each of the internal projections 102' of the upper casing half 86' abut against each other across the filter web 88, which is thus firmly held in position between the incoming and outgoing air chambers 90 and 90' of the air cleaner unit 82. The lower casing half 86 is formed with an opening through which a suitable apertured or tubular member such as a rubber grommet 104 is fitted to the casing half 86 and, likewise, the upper casing half 86' is formed with an opening through which a suitable apertured or tubular member such as a rubber grommet 104' is fitted to the casing half 86' as shown in FIG. 5. Each of the lower and upper casing halves 86 and 86' is preferably constructed of a rigid synthetic resin.

Figure 8:
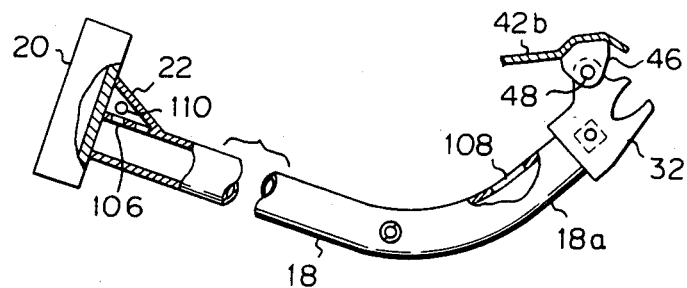
FIG. 8 is a partially cut-away side view of the frame structure of the motorcycle embodying the present invention.

Turning to FIG. 8 of the drawings, the longitudinal frame 18 has an air inlet port 106 formed in its foremost end portion and an air outlet port 108 formed in the upwardly curved rear end portion 18a of the frame 18. The air inlet port 106 in the foremost end portion of the longitudinal frame 18 is open to the atmosphere through a hole 110 in the previously mentioned gusset 22 between the longitudinal frame 18 and the head post 20. The air outlet port 108 formed in the upwardly curved rear end portion 18a of the longitudinal frame 18 is located in proximity to the outer axial end of the rubber grommet 104 fitted to the lower casing half 86 of the air cleaner unit 82 as shown in FIG. 5 and communicates with the incoming air chamber 90 of the air cleaner unit 82 through aperture or passageway in the rubber grommet 104. Thus, fresh air is admitted into the passageway in the longitudinal frame 18 through the hole 110 in the gusset 22 and the air inlet port 106 in the frame 18 and is directed through the air outlet port 108 in the frame 18 and the aperture or passageway in the rubber grommet 104 into the incoming air chamber 90 of the air cleaner unit 82. On the other hand, the rubber grommet 104' fitted to the upper casing half 86' of the air cleaner unit 82 is connected to a carburetor 112 (FIGS. 1 and 2) for the internal combustion engine 54 and provides communication from the outgoing air chamber 90' of the air cleaner unit 82 to the intake port of each of the engine power cylinders of the engine 54 through the carburetor 112. The fresh air directed into the incoming air chamber 90 of the air cleaner unit 82 as above described is passed through the finely perforated filter web 88 into the outgoing air chamber 90' of the unit 82 and is supplied through the aperture or passageway in the rubber grommet 104' and by way of the carburetor 112 into the individual power cylinders of the engine 54.

While it has been described and shown that the frame structure of the motorcycle embodying the present invention is composed of the single longitudinal frame 18, such a frame structure may be substituted, if desired, by two tubular longitudinal frame members spaced apart in parallel from each other transversely of the motorcycle. In this instance, each of the two longitudinal frame members is constituted by a hollow steel pipe and has a rear end portion slanting upwardly above the spindles 16 of the rear wheels 12 similarly to the longitudinal frame 18. The two frame members are jointly welded or otherwise securely connected at their foremost ends to a lower portion of the tubular front head post 20 by suitable fastening or reinforcement means similar to the reinforcement member or gusset 22 secured to the longitudinal frame 18 and the head post 20. Where the frame structure constituted by a single tubular frame is preferred as in the embodiment hereinbefore described, it is important that the frame be appropriately larger in outside diameter than each of the above mentioned two frame members.

From the foregoing description it will have been understood that the motorcycle embodying the present invention has the following features and advantages:

(1) The fuel and oil tank assemblies 38 and 40 supported on the longitudinal frame 18 are enclosed within the rear fender structure 42 when the unitary rear fender structure 36 is maintained in the position permitting the rider to be seated on the seat pad 44. Since the tank assemblies 38 and 40 and internal combustion engine, etc., can thus be exposed when the rear fender structure 42 is detached from and raised above the longitudinal frame 18, the servicing of the various parts covered by the unitary rear fender structure can be readily performed.

(2) The tank cover portion 42a of the rear fender structure 42 is integral with the rear fender portions 42c and is adapted to provide an ample space for the accommodation of the fuel and oil tank assemblies 38 and 40. The measurements of the tank assemblies 38 and 40 are for this reason not restricted by the shape and size of the rear fender structure 42 and can therefore be determined arbitrarily to meet the desired capacities of the tank assemblies. Also, the rear fender structure 42 per se can be designed without strict consideration of the desired measurements of the tank assemblies 38 and 40.

(3) During servicing of the fuel and/or oil tank assemblies 38 and 40, the rear fender structure 42 can be maintained in the raised position supported on the lifting handle 34 and need not be detached and replaced from the motorcycle.

(4) Where the frame structure of a motorcycle according to the present invention is constituted by a single tubular frame as in the described embodiment of the motorcycle, the frame structure can be manufactured economically since such a frame structure can be produced simply by cutting a single elongated pipe to a desired length and then bending the cut segment of the pipe to a desired shape.

(5) Due to the relatively large diameter of the single tubular frame 18 constituting such a frame structure, the frame 18 can be utilized as a "snorkel" type air induction pipe for the air cleaner unit 82.

(6) The longitudinal frame 18 is connected to the front fork structure 24 simply by means of the front head post 20 and the gusset 22 and to the rear fender structure 36 simply by means of the bracket members 32 and 46 and the pivot pin 48, thus providing simplicity of arrangement at each end of the longitudinal frame 18.

(7) The engine and transmission casing structure 58 being suspended from the longitudinal frame 18 and the rear fender structure 36 simply by means of the bracket members 60, 64 and 76 and positioned below, the motorcycle as a whole has a simple and compact construction with the fuel and oil tanks positioned above the longitudinal frame 18 and the engine 54 and the transmission 56 positioned below the longitudinal frame 18.

(8) The construction of the air cleaner unit 82 is adapted to maintain air-tightness between the flange portions 92 and 92' of the lower and upper casing halves 86 and 86' thereof and to achieve ease of assemblage since the filter web 88 can be fitted between the casing halves 86 and 86' simultaneously when the casing halves 86 and 86' are to be assembled to each other. For the same reason, the air cleaner unit 82 can be disassembled easily and efficiently.

While a motorcycle according to the present invention has been described as being embodied in a power-driven tricycle, it will be apparent that these features and advantages of the described embodiment can be achieved in and applicable to a power-driven bicycle.

What is claimed is:

1. In a tricycle comprising:
   a frame structure including a longitudinal frame elongated in a longitudinal direction thereof, two rear wheels rotatably mounted on a rear end portion of said longitudinal frame;
   a head post connected to the frontmost of said frame structure;
   a front fork structure rotatably mounted on said head post and rotatably carrying thereon a front wheel;
   fuel and/or oil tank assemblies supported on and positioned above a front portion of said longitudinal frame;
   a unitary rear fender structure detachably connected to said longitudinal frame and having a front tank cover portion, a rear middle portion which merges rearwardly out of said front tank cover portion and a pair of rear fender portions laterally extending outwardly in opposite directions from said rear middle portion, said front tank cover portion covering generally the whole portions of said fuel and/or oil tank assemblies; and
   a seat assembly mounted partly on said front tank cover portion and partly on said rear middle portion.

2. A tricycle motorcycle as set forth in claim 1, in which said longitudinal frame (18) is constituted by a hollow steel pipe.

3. A tricycle as set forth in claim 2, in which said longitudinal frame (18) has a rear end portion (18a) slanting upwardly above the axis of rotation of said rear wheel (12).

4. A tricycle as set forth in claim 3, further comprising a tubular front head post (20) securely connected to said front fork structure (24), said longitudinal frame (18) being securely connected at its foremost end to said front head post 20 by means of a reinforcement member (22) secured to the longitudinal frame (18) and the front head post (20).

5. A tricycle as set forth in claim 2, further comprising a lifting handle (34) securely attached to the rear end portion (18a) of said longitudinal frame (18) and adapted to engage and support the rear fender structure (36) in said upper position thereof and to facilitate a rider of the motorcycle to manually lift the rear wheel (12).

6. A tricycle as set forth in claim 2, having an internal combustion engine (54) positioned below a front portion of said longitudinal frame (18) and a power transmission (56) positioned at the rear of the engine (54), the motorcycle further comprising an engine and transmission casing structure (58) having said engine and said transmission enclosed therewithin, the casing structure (58) largely consisting of an engine body portion (58a) positioned below a lengthwise intermediate portion of said longitudinal frame (18) and having said engine (54) accommodated therewithin and a transmission casing portion (58b) positioned at the rear of said engine body portion (58a) and having said transmission (56) accommodated therewithin.

7. In a tricycle comprising:
   a frame structure including a longitudinal frame elongated in a longitudinal direction thereof, two rear wheels rotatably mounted on a rear end portion of said longitudinal frame;
   a head post connected to the frontmost of said frame structure;
   a front fork structure rotatably mounted on said head post and rotatably carrying thereon a front wheel;
   fuel and/or oil tank assemblies supported on and positioned above a front portion of said longitudinal frame;
   a unitary rear fender structure detachably connected to said longitudinal frame and having a front tank cover portion, a rear middle portion which merges rearwardly out of said front tank cover portion and a pair of rear fender portions laterally extending outwardly in opposite directions from said rear middle portion; and
   a seat assembly mounted partly on said front tank cover portion and partly on said rear middle portion;
   said rear fender structure as a whole is pivotally movable between a lower angular position and an upper angular position about an axis fixed with respect to said frame structure and directed in a transverse direction of the tricycle.

8. A tricycle as set forth in claim 7, in which said longitudinal frame is constituted by a hollow steel pipe.

* * * * *